UNITED STATES PATENT OFFICE.

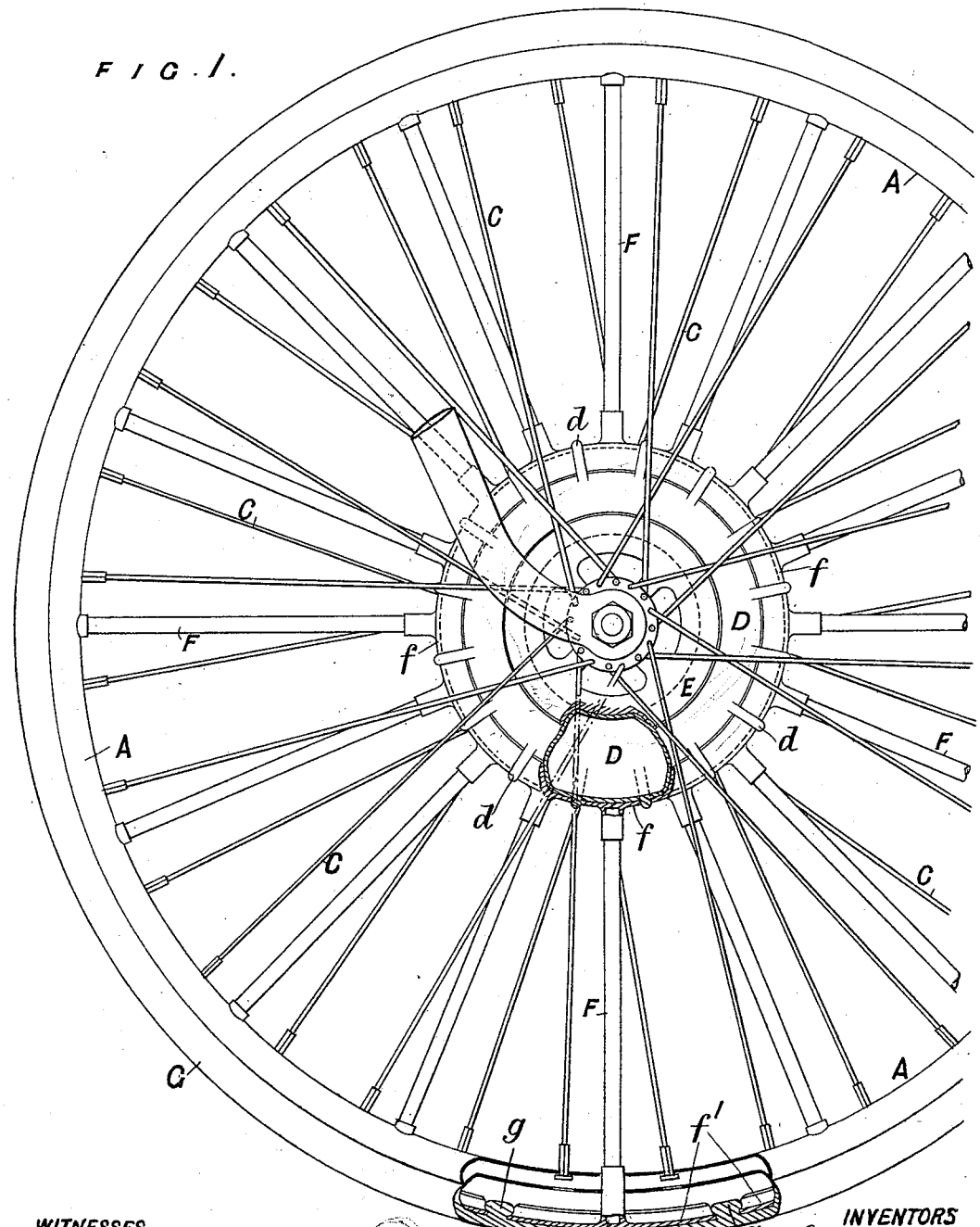

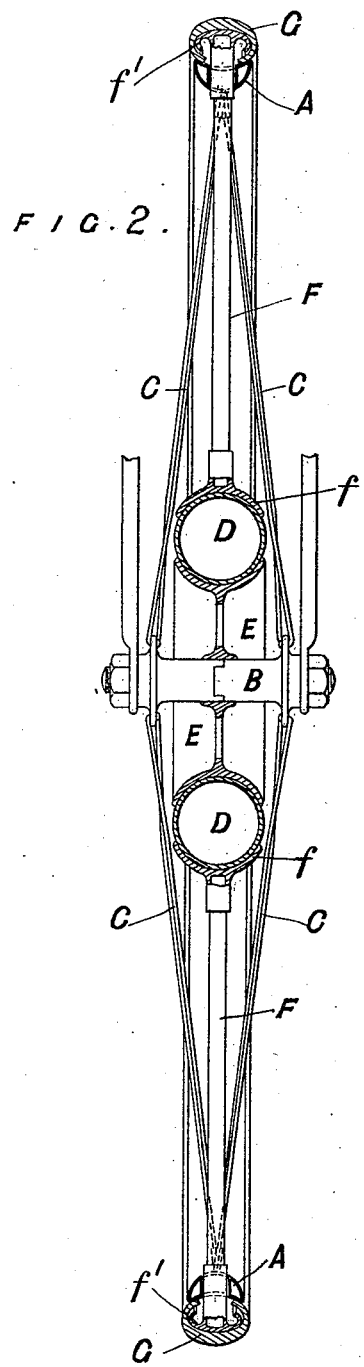

GEORGE WASHINGTON SMILEY AND FOREST WILLIAM DUNLAP, OF LONDON, ENGLAND; SAID DUNLAP ASSIGNOR TO SAID SMILEY.

WHEEL FOR BICYCLES.

SPECIFICATION forming part of Letters Patent No. 522,090, dated June 26, 1894.

Application filed August 3, 1893. Serial No. 482,280. (No model.)

*To all whom it may concern:*

Be it known that we, GEORGE WASHINGTON SMILEY, gentleman, and FOREST WILLIAM DUNLAP, engineer, both of 26 Coventry Street, London, W., England, have invented new and useful Improvements in Wheels for Bicycles or other Vehicles, of which the following is a full, clear, and exact description.

This invention relates to an improvement in wheels for bicycles and other vehicles, and it has for its object to obtain all the advantages as regards elasticity and freedom from vibration obtained by the use of a pneumatic tire without the attendant liability of injury to which such inflated tires are exposed.

We are aware that it has been heretofore proposed to apply a pneumatic cushion between the hub and rim of the wheel, but all such previous attempts have involved a loss of the lateral stiffness of the wheel.

The invention consists essentially in the combination, with a wheel of the ordinary bicycle type, of a pneumatic cushion situated between the hub and the rim of the wheel and of a tire and thrust spokes movable in the radial direction independently of the wheel rim but guided by the rim in such radial movement so that while the structure of the wheel proper upon which its lateral and radial stiffness depends remains unaltered the elastic cushion by which resiliency of tread is obtained is transferred from the external tire to a point intermediate of the rim and the hub where it is not exposed to injury.

Reference is to be had to the accompanying drawings, forming part of this specification, wherein—

Figure 1 is a face view of the improved wheel partly broken away to show the construction of the pneumatic cushion and tire. Fig. 2 is a cross section of same.

A is the rim, B the hub, and C the tensional spokes constituting a complete ordinary wheel of the bicycle type, less the tire.

D is an annular tubular air cushion fitting around the grooved periphery of a disk E carried by the hub so that the cushion lies in the central plane of the wheel between the oppositely-splayed spokes C.

F are radial thrust spokes terminating at their inner ends in shoes $f$ in the form of curved segments adapted to embrace the outer periphery of the air cushion D while their outer ends pass through guide holes in the wheel rim A and terminate in metallic segments or shoes $f'$ which are in turn covered by a rubber tire G.

In order to prevent circumferential displacement of the shoes $f$ about the air cushion D the latter may have ribs $d$ molded on its outer surface against which the ends of the shoes $f$ abut, and similarly to connect the tire G to the segments $f'$ and prevent displacement of the latter, cross ribs $g$ are molded on the inner surface of the tire against which the ends of the segments $f'$ abut and with which they engage as shown. The spokes F are free to slide through their guide holes in the rim, A, in order to transmit the thrust from the tire G to the elastic cushion D and they are preferably tubular in order to combine stiffness with lightness. They may be connected with the segments $f$ and $f'$ by screwing into (preferably oppositely threaded) sockets on the latter to admit of radial adjustment.

The tire G is made preferably in the same way as the outer sheath of an ordinary pneumatic tire is now made, that is to say it is made of rubber and canvas molded on a core to the annular tubular form and then slit along the line of its inner circumference. It is thickened at the tread or part which comes in contact with the ground but it is not inflated. To prevent the entrance of dirt between it and the wheel rim A, the tire G is preferably cemented at its edges to the rim A, as will be readily understood. We would, however, have it understood that the invention is not limited to the form of tire G which might be solid with the segments or shoes $f'$ embedded therein, or the segments might be externally concave instead of convex in the transverse direction to receive a solid rubber tire, but the form illustrated is preferred.

Provision must in all cases be made for the allowance of sufficient play of the shoes $f'$ in the radial direction independently of the rim A so as to permit of the thrust being wholly transmitted to the cushion D without in any way affecting the tension of the spokes C, this being the essence of the invention, so that the rim A fulfills only the function of a guide to prevent lateral motion of the spokes F and to maintain the lateral stiffness of the wheel. Instead of separate segments $f'$ for the spokes F these may be a continuous rim. In either case the segments or rim is of thin metal and is so curved in the transverse direction as to combine lightness with stiffness to resist flexure.

It will also be obvious that the elastic cushion D instead of being hollow and inflated might be solid and that instead of being carried by the hub it might be carried by the spokes C.

Having now particularly described and ascertained the nature of our said invention and in what manner the same is to be performed, we declare that what we claim is—

1. A wheel of the ordinary bicycle type having an annular elastic cushion supported by or immediately around the hub, an external tire movable only in the plane of the wheel independently of the rim, thrust spokes free to slide in, but supported laterally by the rim and terminating in segments supporting the external tire whereby the radial thrust is transmitted directly from the tire to the elastic cushion without passing through the wheel rim, substantially as specified.

2. A wheel of the bicycle type having an annular tubular inflated cushion supported by or around the hub and between the oppositely-splayed tensional spokes, ribs on the external surface of the cushion, shoes embracing such surface between the ribs, thrust spokes connected to the shoes and sliding freely through but guided by the wheel rim, segments (or a continuous rim) attached to the thrust spokes, and a hollow rubber tire encircling and attached to such movable segments or rim and connected to the wheel rim so as to permit of free play and cause radial thrust to be transmitted directly to the cushion independently of the wheel rim, substantially as specified.

Dated this 19th day of July, 1893.

GEORGE WASHINGTON SMILEY.
FOREST WILLIAM DUNLAP.

Witnesses:
BAYARD C. DIXON,
T. W. KENNARD,
*Clerk to A. M. & Wm. Clark, Patent Agents,*
*53 Chancery Lane, London.*